US012663350B2

(12) United States Patent
Teruuchi et al.

(10) Patent No.: US 12,663,350 B2
(45) Date of Patent: Jun. 23, 2026

(54) PARTICLE MONITORING SYSTEM, PARTICLE MONITORING METHOD, AND MONITORING DEVICE

(71) Applicant: Tokyo Electron Limited, Tokyo (JP)

(72) Inventors: Satoru Teruuchi, Kurokawa-gun (JP);
Jun Hirose, Kurokawa-gun (JP);
Kazuya Nagaseki, Kurokawa-gun (JP);
Shinji Himori, Kurokawa-gun (JP)

(73) Assignee: Tokyo Electron Limited, Tokyo (JP)

( * ) Notice: Subject to any disclaimer, the term of this patent is extended or adjusted under 35 U.S.C. 154(b) by 153 days.

(21) Appl. No.: 18/505,066

(22) Filed: Nov. 8, 2023

(65) Prior Publication Data

US 2024/0068921 A1 Feb. 29, 2024

Related U.S. Application Data

(63) Continuation of application No. PCT/JP2022/019944, filed on May 11, 2022.

(30) Foreign Application Priority Data

May 13, 2021 (JP) .................................. 2021-081726

(51) Int. Cl.
*G01N 15/0205* (2024.01)
*G01N 15/0227* (2024.01)
(Continued)

(52) U.S. Cl.
CPC ..... *G01N 15/0227* (2013.01); *G01N 15/0211* (2013.01); *G01N 2015/1029* (2024.01); *G01N 2223/073* (2013.01)

(58) Field of Classification Search
CPC ........... G01N 15/0227; G01N 15/0211; G01N 2015/1029; G01N 2223/073;
(Continued)

(56) References Cited

U.S. PATENT DOCUMENTS 8,531,664 B2 * 9/2013 Nagaike ............. G01N 15/0205
356/338
2017/0221775 A1 8/2017 Tedeschi et al.

FOREIGN PATENT DOCUMENTS

CN 101517701 A 8/2009
EP 0 837 315 A2 4/1998
(Continued)

OTHER PUBLICATIONS

International Search Report issued in PCT/JP2022/019944; mailed Jul. 19, 2022.

*Primary Examiner* — Rebecca C Bryant
(74) *Attorney, Agent, or Firm* — Studebaker Brackett PLLC

(57) ABSTRACT

A particle monitoring system includes a light emitting device for irradiating an inside of a plasma processing apparatus with light, and a monitoring device to be placed on a stage in the plasma processing apparatus. The monitoring device includes a base substrate, a plurality of imaging devices, and a control device. The base substrate has a plate shape. The plurality of imaging devices have optical axes facing upward on the base substrate, and are disposed apart from each other to capture images including scattered light from the particle irradiated with the light. The control device discriminates the particle in the images captured by the plurality of imaging devices.

12 Claims, 8 Drawing Sheets

(51) Int. Cl.
    *G01N 15/1433*    (2024.01)
    *G01N 15/10*     (2006.01)

(58) Field of Classification Search
    CPC ... G01N 2015/1486; G01N 2015/1493; G01N
            15/1433; G01N 21/94; G01N 15/1434;
                                  G01N 21/49
    See application file for complete search history.

(56)                     References Cited

FOREIGN PATENT DOCUMENTS

| JP | H11-044654 A | 2/1999 |
|----|--------------|--------|
| JP | 2011-180015 A | 9/2011 |
| JP | 2015-018845 A | 1/2015 |
| JP | 2018-169288 A | 11/2018 |
| JP | 2019-067942 A | 4/2019 |
| WO | 2008/042199 A2 | 4/2008 |

* cited by examiner

PARTICLE MONITORING SYSTEM, PARTICLE MONITORING METHOD, AND MONITORING DEVICE

CROSS-REFERENCE TO RELATED APPLICATIONS

This application is a continuation application of PCT Application No. PCT/JP2022/019944, filed on May 11, 2022, which claims the benefit of priority from Japanese Patent Application No. 2021-081726, filed on May 13, 2021. The entire contents of the above listed PCT and priority applications are incorporated herein by reference.

BACKGROUND

Field

Exemplary embodiments of the present disclosure relate to a particle monitoring system, a particle monitoring method, and a monitoring device.

Description of the Related Art

Japanese Unexamined Patent Publication No. 2011-180015 discloses a technique for measuring the number of particles in a chamber. In this technique, an in situ particle monitor (ISPM) including a laser light oscillator and a photodetector is provided in the chamber. The ISPM measures the number of particles moving in the chamber.

SUMMARY

In one exemplary embodiment, there is provided a particle monitoring system for measuring a particle in a plasma processing apparatus. The system includes a light emitting device for irradiating an inside of the plasma processing apparatus with light, and a monitoring device to be placed on a stage in the plasma processing apparatus. The monitoring device includes a base substrate, a plurality of imaging devices, and a control device. The base substrate has a plate shape. The plurality of imaging devices have optical axes facing upward on the base substrate, and are disposed apart from each other to capture images including scattered light from the particle irradiated with the light. The control device discriminates the particle in the images captured by the plurality of imaging devices.

DETAILED DESCRIPTION

Figure 1:
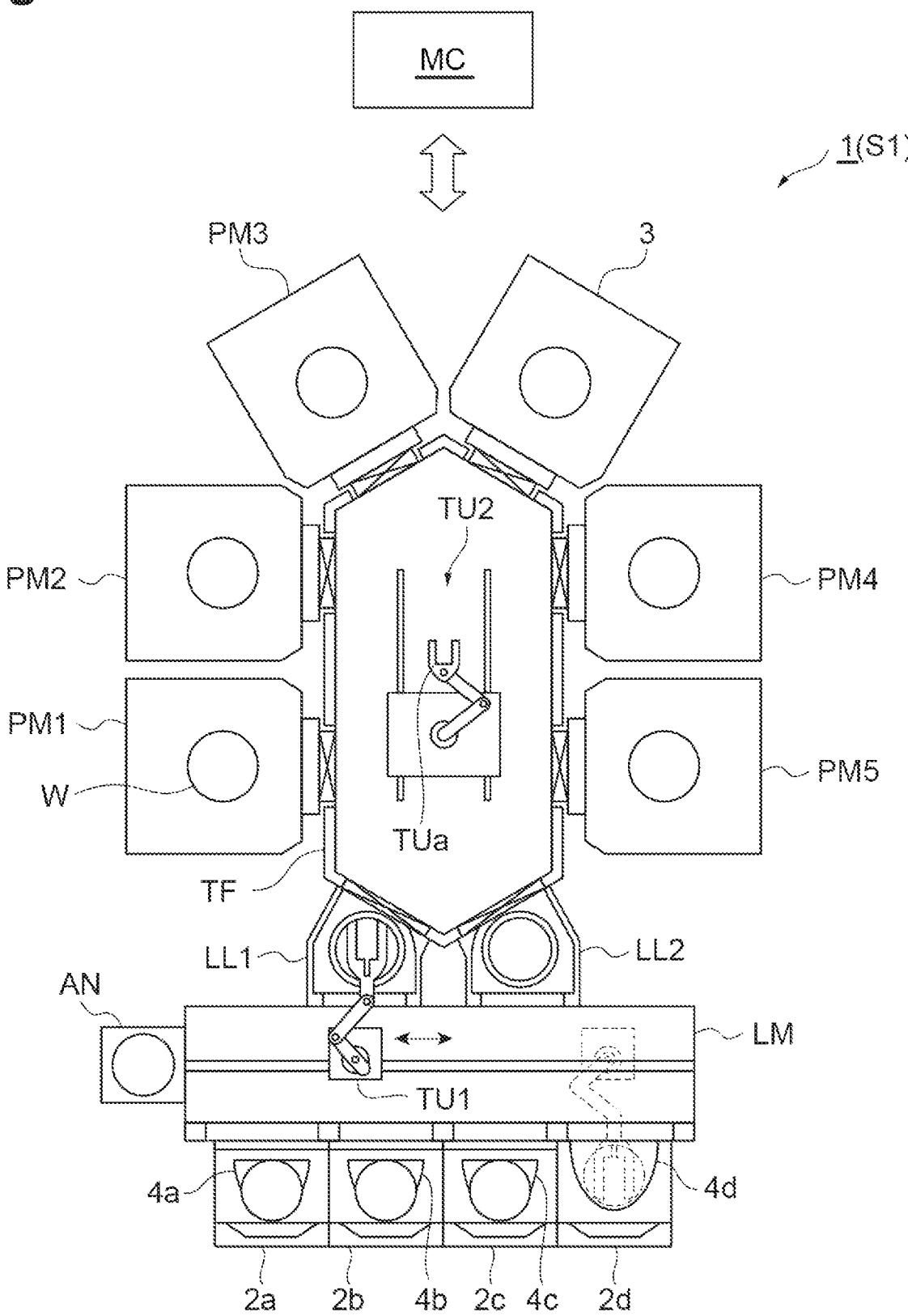
FIG. 1 is a diagram illustrating a processing system.

Hereinafter, various exemplary embodiments will be described.

In one exemplary embodiment, there is provided a particle monitoring system for measuring a particle in a plasma processing apparatus. The system includes a light emitting device for irradiating an inside of the plasma processing apparatus with light, and a monitoring device to be placed on a stage in the plasma processing apparatus. The monitoring device includes a base substrate, a plurality of imaging devices, and a control device. The base substrate has a plate shape. The plurality of imaging devices have optical axes facing upward on the base substrate, and are disposed apart from each other to capture images including scattered light from the particle irradiated with the light. The control device discriminates the particle in the images captured by the plurality of imaging devices.

In another exemplary embodiment, there is provided a particle monitoring method of measuring a particle in a plasma processing apparatus by using a monitoring device. The monitoring device includes a plate-shaped base substrate, and a plurality of imaging devices having optical axes facing upward on the base substrate, and being disposed apart from each other. The method includes a step of placing the monitoring device on a stage in a chamber of the plasma processing apparatus. The method includes a step of irradiating an inside of the chamber of the plasma processing apparatus with light. The method includes a step of imaging scattered light from the particle irradiated with the light by the plurality of imaging devices. The method includes a step of discriminating the particle in an image captured by the plurality of imaging devices.

In the particle monitoring system and the particle monitoring method of the embodiments described above, the particle in the plasma processing apparatus is imaged by the plurality of imaging devices of the monitoring device placed on the stage. The plurality of imaging devices are disposed apart from each other on the base substrate. Therefore, the imaging ranges imaged by the respective imaging devices are different from each other. That is, each of the imaging devices can image the particle in different regions in the plasma processing apparatus. Therefore, in the particle monitoring system and the particle monitoring method, it is possible to acquire a distribution of the particle in the plasma processing apparatus by discriminating the particle in the images captured by the plurality of imaging devices.

In the one exemplary embodiment, the light emitting device may be a laser oscillator for emitting laser light as the light.

In the one exemplary embodiment, the control device may count the particle in the images captured by the plurality of imaging devices.

In the one exemplary embodiment, the control device may acquire a position of the particle in the images captured by the plurality of imaging devices. With this configuration, a more detailed distribution of the particle can be acquired.

In the one exemplary embodiment, the control device may acquire a size of the particle from the image captured by the plurality of imaging devices.

In the one exemplary embodiment, an imaging range of each of the plurality of imaging devices in the plasma processing apparatus may not include an overlapping region. In this configuration, the particle is prevented from being counted in an overlapping manner.

In the other exemplary embodiment, the step of the imaging by the plurality of imaging devices may be executed in a state where a gas is supplied into the chamber. With this configuration, the particle under an environment where the gas is supplied into the chamber can be counted.

In the other exemplary embodiment, the step of the imaging by the plurality of imaging devices may be executed in a state where a plasma is generated in the chamber. With this configuration, the particle under an environment where the plasma is generated can be counted.

Hereinafter, various embodiments will be described in detail with reference to the drawings. The same reference numerals will be given to the same or corresponding parts in each drawing.

A monitoring device 100 according to one exemplary embodiment forms a particle monitoring system in cooperation with a processing system 1 that has a function as a semiconductor manufacturing apparatus S1. First, a processing system that includes a processing device for processing a workpiece and a transport device for transporting the workpiece to the processing device will be described. FIG. 1 is a diagram illustrating the processing system. The processing system 1 includes tables 2a to 2d, containers 4a to 4d, a loader module LM, an aligner AN, load lock modules LL1 and LL2, a process modules PM1 to PM5, a transfer module TF, and a controller MC. The number of tables 2a to 2d, the number of containers 4a to 4d, the number of load lock modules LL1 and LL2, and the number of process modules PM1 to PM5 are not limited, and any number equal to or greater than one can be used.

The tables 2a to 2d are arranged along one edge of the loader module LM. The containers 4a to 4d are mounted on the tables 2a to 2d, respectively. Each of the containers 4a to 4d is, for example, a container called a front opening unified pod (FOUP). Each of the containers 4a to 4d can be configured to accommodate a workpiece W. The workpiece W has a substantial disc shape like a wafer.

Inside the loader module LM, there is a chamber wall that defines a transport space in an atmospheric pressure state. A transport device TU1 is provided in this transport space. The transport device TU1 is, for example, an articulated robot, and is controlled by the controller MC. The transport device TU1 is configured to transport the workpiece W between the containers 4a to 4d and the aligner AN, between the aligner AN and the load lock modules LL1 to LL2, and between the load lock modules LL1 to LL2 and the containers 4a to 4d.

Figure 2:
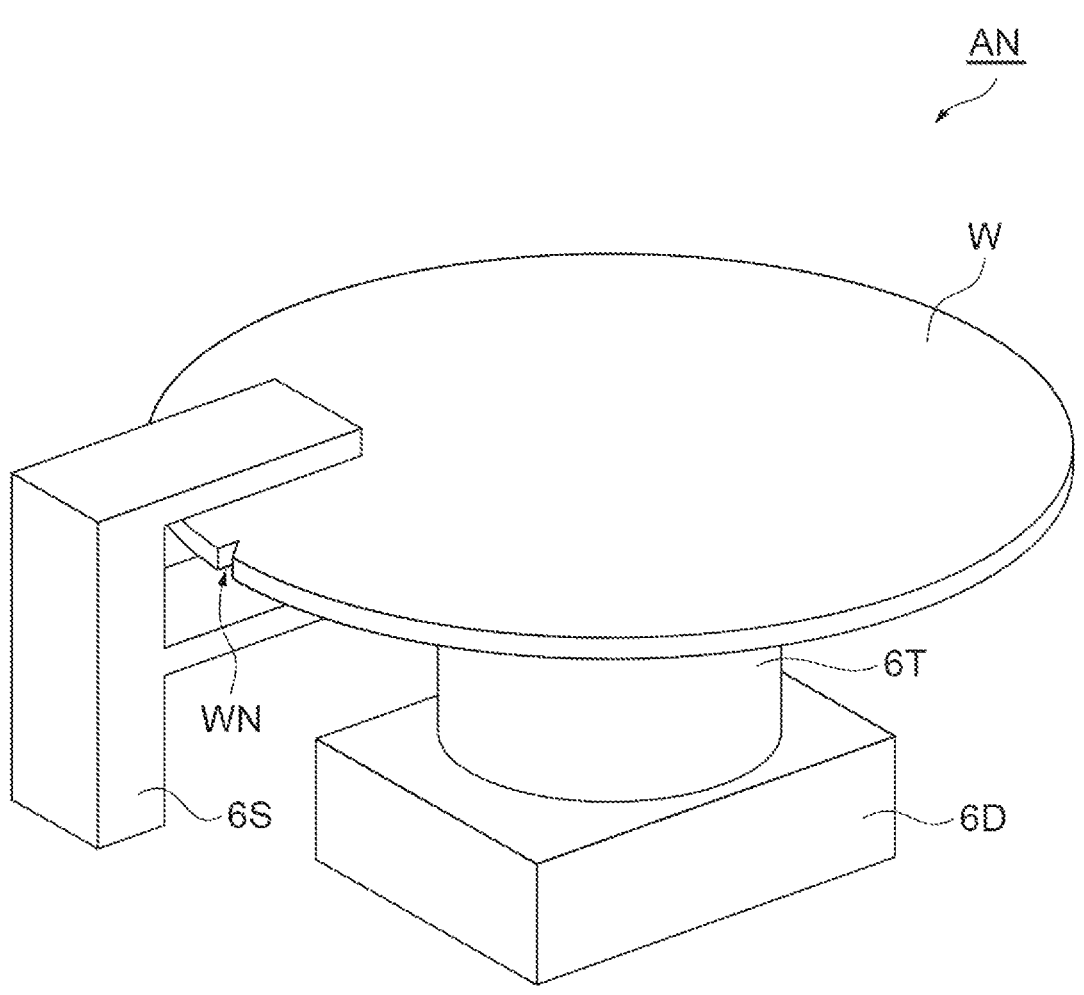
FIG. 2 is a perspective view illustrating an aligner.

The aligner AN is connected to the loader module LM. The aligner AN is configured to adjust a position of the workpiece W (calibrate the position). FIG. 2 is a perspective view illustrating an aligner. The aligner AN includes a support stand 6T, a drive device 6D, and a sensor 6S. The support stand 6T is a stand that can rotate around an axis extending in a vertical direction, and is configured to support the workpiece W on the support stand 6T. The support stand 6T is rotated by the drive device 6D. The drive device 6D is controlled by the controller MC. When the support stand 6T is rotated by power from the drive device 6D, the workpiece W placed on the support stand 6T is also rotated.

The sensor 6S is an optical sensor, and detects an edge of the workpiece W while the workpiece W is rotated. From the result of detecting the edge, the sensor 6S detects an amount of deviation of an angle position of a notch WN (or another marker) of the workpiece W with respect to a reference angle position and an amount of deviation of a center position of the workpiece W with respect to the reference position. The sensor 6S outputs the amount of deviation of the angle position of the notch WN and the amount of deviation of the center position of the workpiece W to the controller MC. The controller MC calculates an amount of rotation of the support stand 6T for correcting the angle position of the notch WN to the reference angle position based on the amount of deviation of the angle position of the notch WN. The controller MC controls the drive device 6D to rotate the support stand 6T as much as the amount of rotation. Therefore, the angle position of the notch WN can be corrected to the reference angle position. In addition, the controller MC may correct the angle position of the notch WN to any angle position. In addition, the controller MC controls a position of an end effector of the transport device TU1 when receiving the workpiece W from the aligner AN based on the amount of deviation of the center position of the workpiece W. Therefore, the center position of the workpiece W coincides with a predetermined position on the end effector of the transport device TU1.

Returning to FIG. 1, each of the load lock module LL1 and the load lock module LL2 is provided between the loader module LM and the transfer module TF. Each of the load lock module LL1 and the load lock module LL2 provides a preliminary decompression chamber.

The transfer module TF is airtightly connected to the load lock module LL1 and the load lock module LL2 via a gate valve. The transfer module TF provides a decompression chamber capable of reducing a pressure. A transport device TU2 is provided in this decompression chamber. The transport device TU2 is, for example, an articulated robot having a transport arm TUa, and is controlled by the controller MC. The transport device TU2 is configured to transport the workpiece W between the load lock modules LL1 to LL2 and the process modules PM1 to PM5, and between any two process modules of the process modules PM1 to PM5.

The process modules PM1 to PM5 are airtightly connected to the transfer module TF via the gate valve. Each of the process modules PM1 to PM5 is a processing device configured to perform dedicated processing such as plasma processing on the workpiece W.

A series of operations when the processing on the workpiece W is performed in the processing system 1 will be illustrated as follows. The transport device TU1 of the loader module LM takes out the workpiece W from any of the containers 4a to 4d, and transports the workpiece W to the aligner AN. Subsequently, the transport device TU1 takes out the workpiece W having the adjusted position from the aligner AN, and transports the workpiece W to one of the load lock module LL1 and the load lock module LL2. Next, one load lock module reduces the pressure in the preliminary decompression chamber to a predetermined pressure. Next, the transport device TU2 of the transfer module TF takes out the workpiece W from one of the load lock modules and transports the workpiece W to any of the process modules PM1 to PM5. Then, one or more process modules among the process modules PM1 to PM5 perform the processing on the workpiece W. Then, the transport device TU2 transports the processed workpiece W from the process module to one of the load lock module LL1 and the load lock module LL2. Next, the transport device TU1 transports the workpiece W from one of the load lock modules to any of the containers 4a to 4d.

This processing system 1 includes the controller MC as described above. The controller MC can be a computer including a processor, a storage device such as a memory, a display device, an input and output device, a communication device, and the like. The series of operations of the processing system 1 described above are realized by controlling each portion of the processing system 1 by the controller MC according to a program stored in the storage device.

Figure 3:
FIG. 3 is a diagram illustrating an example of a plasma processing apparatus.

FIG. 3 is a diagram illustrating an example of a plasma processing apparatus that can be adopted as any of the process modules PM1 to PM5. A plasma processing apparatus 10 illustrated in FIG. 3 is an electrostatic capacitance-coupling type plasma etching apparatus. The plasma processing apparatus 10 includes a chamber body 12 having a substantially cylindrical shape. The chamber body 12 is formed of, for example, aluminum, and an inner wall surface thereof can benodized. This chamber body 12 is grounded for safety.

A support portion 14 having a substantially cylindrical shape is provided on a bottom portion of the chamber body 12. The support portion 14 is formed of, for example, an insulating material. The support portion 14 is provided in the chamber body 12, and extends upward from the bottom portion of the chamber body 12. In addition, a stage ST is provided in a chamber S provided by the chamber body 12. The stage ST is supported by the support portion 14.

The stage ST includes a lower electrode LE and an electrostatic chuck ESC. The lower electrode LE includes a first plate 18a and a second plate 18b.

The first plate 18a and the second plate 18b are formed of, for example, a metal such as aluminum, and have a substantial disc shape. The second plate 18b is provided on the first plate 18a, and is electrically connected to the first plate 18a.

The electrostatic chuck ESC is provided on the second plate 18b. The electrostatic chuck ESC has a structure in which an electrode, which is a conductive film, is disposed between a pair of insulating layers or insulating sheets, and has a substantial disc shape. A direct current power supply 22 is electrically connected to the electrode of the electrostatic chuck ESC via a switch 23. This electrostatic chuck ESC adsorbs the workpiece W by an electrostatic force such as a Coulomb force generated by a direct current voltage from the direct current power supply 22. Therefore, the electrostatic chuck ESC can hold the workpiece W.

A focus ring FR is provided on a peripheral edge portion of the second plate 18b. This focus ring FR is provided to surround the edge of the workpiece W and the electrostatic chuck ESC. The focus ring FR can be formed of any of various materials such as silicon, silicon carbide, and silicon oxide.

A refrigerant flow path 24 is provided inside the second plate 18b. The refrigerant flow path 24 forms a temperature control mechanism. Refrigerant is supplied to the refrigerant flow path 24 from a chiller unit provided outside the chamber body 12 via a pipe 26a. The refrigerant supplied to the refrigerant flow path 24 is returned to the chiller unit via a pipe 26b. In this manner, the refrigerant is circulated between the refrigerant flow path 24 and the chiller unit. A temperature of the workpiece W supported by the electrostatic chuck ESC is controlled by controlling a temperature of this refrigerant.

A plurality of (for example, three) through-holes 25 penetrating the stage ST are formed in the stage ST. The plurality of through-holes 25 are formed inside the electrostatic chuck ESC in a plan view. A lift pin 25a is inserted into each of the through-holes 25. In FIG. 3, one through-hole 25 into which one lift pin 25a is inserted is illustrated. The lift pin 25a is provided to be vertically movable in the through-hole 25. When the lift pin 25a rises, the workpiece W supported on the electrostatic chuck ESC rises.

In the stage ST, a plurality of (for example, three) through-holes 27 penetrating the stage ST (lower electrode LE) are formed at a position outside the electrostatic chuck ESC in a plan view. A lift pin 27a is inserted into each of the through-holes 27. In FIG. 3, one through-hole 27 into which one lift pin 27a is inserted is illustrated. The lift pin 27a is provided to be vertically movable in the through-hole 27. When the lift pin 27a rises, the focus ring FR supported on the second plate 18b rises.

In addition, a gas supply line 28 is provided in the plasma processing apparatus 10. The gas supply line 28 supplies a heat transfer gas from a heat transfer gas supply mechanism, such as a He gas, for example, to a place between an upper surface of the electrostatic chuck ESC and a back surface of the workpiece W.

In addition, the plasma processing apparatus 10 includes an upper electrode 30. The upper electrode 30 is disposed above the stage ST to face the stage ST. The upper electrode 30 is supported on the upper portion of the chamber body 12 via an insulating shielding member 32. The upper electrode 30 can include a top plate 34 and a support 36. The top plate 34 faces the chamber S, and the top plate 34 is provided with a plurality of gas discharge holes 34a. The top plate 34 can be formed of silicon or quartz. Alternatively, the top plate 34 can be configured by forming a plasma-resistant film such as yttrium oxide on a surface of an aluminum base material.

The support 36 detachably supports the top plate 34, and can be made of a conductive material such as aluminum, for example. The support 36 can have a water-cooled structure. A gas diffusion chamber 36a is provided inside the support 36. A plurality of gas flow holes 36b communicating with the gas discharge hole 34a extend downward from this gas diffusion chamber 36a. In addition, the support 36 is formed with a gas introduction port 36c for guiding processing gas into the gas diffusion chamber 36a, and a gas supply pipe 38 is connected to the gas introduction port 36c.

A gas source group 40 is connected to the gas supply pipe 38 via a valve group 42 and a flow rate controller group 44. The gas source group 40 includes a plurality of gas sources for a plurality of types of gases. The valve group 42 includes a plurality of valves, and the flow rate controller group 44 includes a plurality of flow rate controllers such as mass flow controllers. The plurality of gas sources of the gas source group 40 are connected to the gas supply pipe 38 via the corresponding valve of the valve group 42 and the corresponding flow rate controller of the flow rate controller group 44, respectively.

In addition, in the plasma processing apparatus 10, a depot shield 46 is detachably provided along an inner wall of the chamber body 12. The depot shield 46 is also provided on the outer periphery of the support portion 14. The depot shield 46 prevents etching by-products (depots) from adhering to the chamber body 12, and can be configured by coating an aluminum material with ceramics such as yttrium oxide.

An exhaust plate 48 is provided on a bottom portion side of the chamber body 12, and between the support portion 14 and the side wall of the chamber body 12. The exhaust plate 48 can be configured, for example, by coating an aluminum material with ceramics such as yttrium oxide. In the exhaust plate 48, a plurality of holes penetrating in a plate-thickness direction are formed. An exhaust port 12e is provided below the exhaust plate 48, and at the chamber body 12. An exhaust device 50 is connected to the exhaust port 12e via an exhaust pipe 52. The exhaust device 50 has a vacuum pump such as a pressure regulating valve and a turbo molecular pump, and can reduce the pressure of the space in the chamber body 12 to a desired degree of vacuum. In addition, a loading and unloading port 12g of the workpiece W is provided on the side wall of the chamber body 12, and the loading and unloading port 12g can be opened and closed by a gate valve 54.

In addition, the plasma processing apparatus 10 further includes a first radio frequency power supply 62 and a second radio frequency power supply 64. The first radio frequency power supply 62 is a power supply that generates a first radio frequency for plasma generation, and generates a radio frequency having a frequency of, for example, 27 to 100 MHz. The first radio frequency power supply 62 is connected to the upper electrode 30 via a matcher 66. The matcher 66 includes a circuit for matching an output impedance of the first radio frequency power supply 62 with an input impedance of a load side (upper electrode 30 side). The first radio frequency power supply 62 may be connected to the lower electrode LE via the matcher 66.

The second radio frequency power supply 64 is a power supply that generates a second radio frequency for drawing ions into the workpiece W, and generates, for example, a radio frequency in a range of 400 kHz to 13.56 MHz. The second radio frequency power supply 64 is connected to the lower electrode LE via a matcher 68. The matcher 68 includes a circuit for matching an output impedance of the second radio frequency power supply 64 with an input impedance of a load side (lower electrode LE side).

In the plasma processing apparatus 10, a gas from one or more gas sources selected from the plurality of gas sources is supplied to the chamber S. In addition, the pressure in the chamber S is set to a predetermined pressure by the exhaust device 50. Further, the gas in the chamber S is excited by the first radio frequency from the first radio frequency power supply 62. Therefore, a plasma is generated. Then, the workpiece W is processed by the generated active species. If necessary, ions may be drawn into the workpiece W by a bias based on the second radio frequency from the second radio frequency power supply 64.

A window 12w that transmits light is provided at a peripheral wall of the chamber body 12. The window 12w is provided at a position above the stage ST in an up-down direction. A laser oscillator 70 (light emitting device) that emits laser light 70L can be disposed on an outside of the window 12w. The laser oscillator 70 is disposed on an outside of the chamber body 12 such that the laser light 70L is emitted from the window 12w into the chamber S. Various optical components may be disposed on an optical path between the window 12w and the laser oscillator 70. The laser oscillator 70 irradiates an inside of the chamber body 12 with the laser light 70L via the window 12w. An optical axis of the laser light 70L emitted from the laser oscillator 70 may be parallel to the stage ST above the stage ST.

The laser oscillator 70 scans the inside of the chamber body along a horizontal direction with, for example, the laser light 70L in a pulse shape. That is, an inside of a horizontal plane which is high by a predetermined height from the stage ST is scanned with the laser light 70L. In one example, a wavelength of the laser light 70L may be approximately 532 nm, and the wavelength of the laser light 70L is not limited to this example. For example, the laser oscillator 70 may be connected to a computer 88 which will be described below, and the operation of the laser oscillator 70 may be controlled by the computer 88.

Subsequently, the monitoring device 100 will be described. The monitoring device 100 images particles in the chamber body 12 of the plasma processing apparatus 10. The monitoring device 100 of an example may be referred to as a jig since the monitoring device 100 is a device for disposing an imaging device at a predetermined position on the stage ST in the process module PM (plasma processing apparatus 10).

Figure 4:
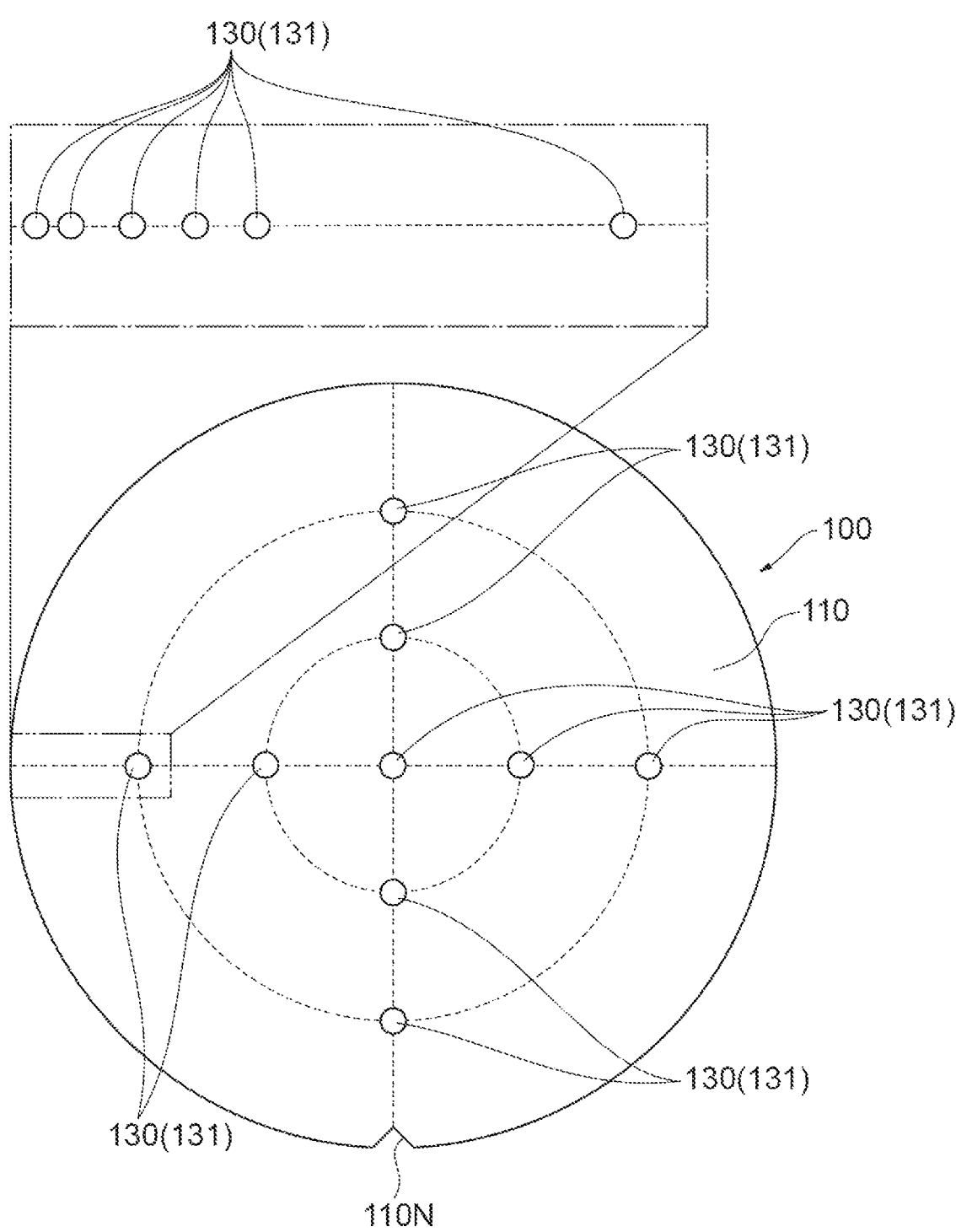
FIG. 4 is a plan view illustrating a monitoring device of an example when viewed from an upper surface side.
Figure 5:
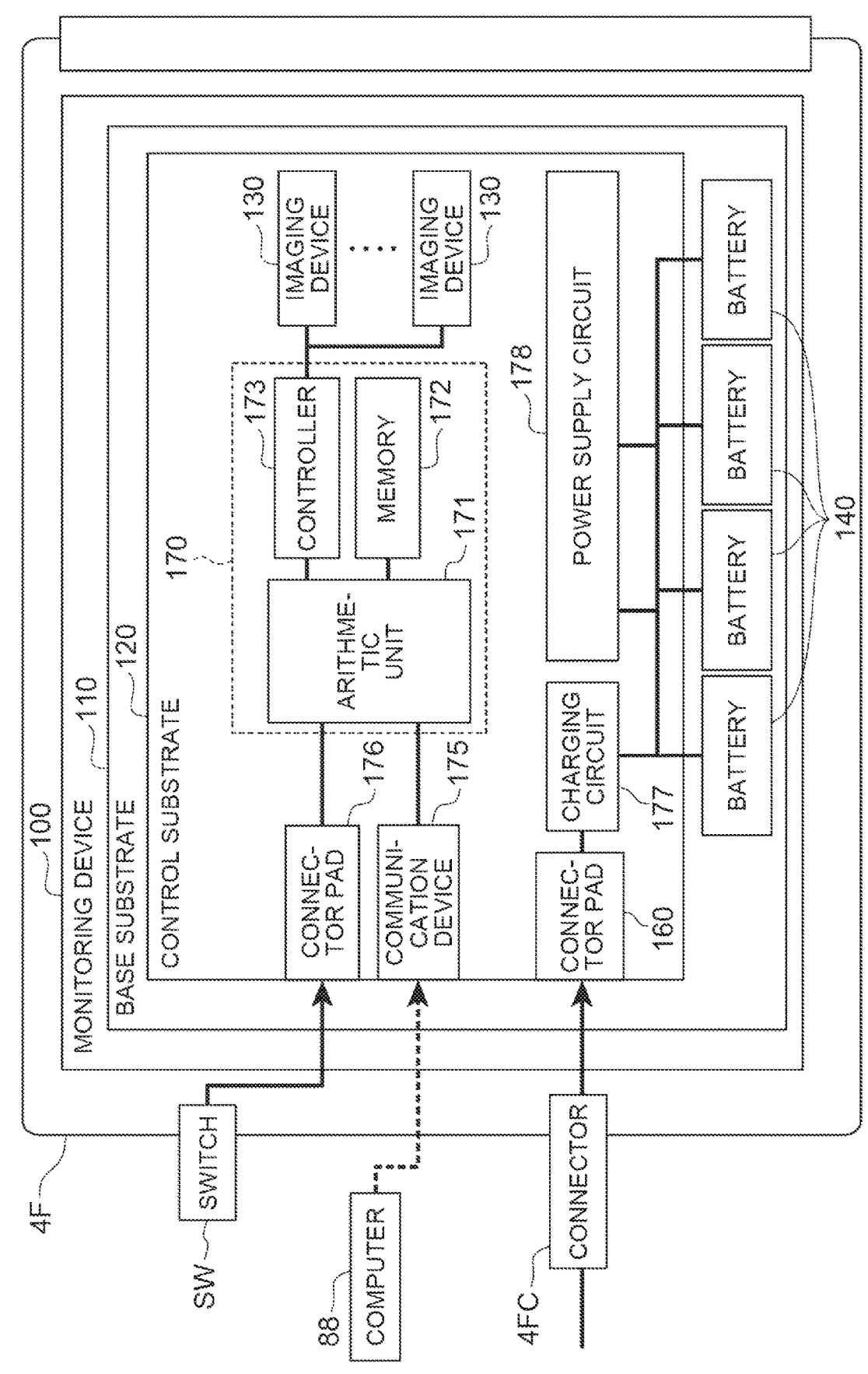
FIG. 5 is a block diagram illustrating a configuration of the monitoring device of the example.

FIG. 4 is a schematic plan view of the monitoring device 100 according to an example when viewed from an upper surface side. FIG. 5 is a block diagram illustrating the monitoring device 100 of the example. In FIG. 5, a dedicated FOUP 4F that is used when using the monitoring device 100 is also schematically illustrated. The FOUP 4F may be any of the containers 4a to 4d. The monitoring device 100 includes a base substrate 110, a control substrate 120, and a battery 140. The monitoring device 100 can be transported from the FOUP 4F onto the stage ST (that is, on the electrostatic chuck ESC) by the transport devices TU1 and TU2 of the processing system 1.

That is, the transport device TU1 takes out the monitoring device 100 from the FOUP 4F, and transports the monitoring device 100 to the aligner AN. Subsequently, the transport device TU1 takes out the monitoring device 100 having the adjusted position from the aligner AN, and transports the monitoring device 100 to one of the load lock module LL and the load lock module LL2. Next, the transport device TU2 of the transfer module TF takes out the monitoring device 100 from one of the load lock modules, and transports the monitoring device 100 onto the stage ST of any of the process modules PM1 to PM5.

The base substrate 110 may be a substrate using a disk-shaped wafer similar to the workpiece W as an example, so that the substrate can be transported by the transport devices TU1 and TU2 of the processing system 1. Meanwhile, the base substrate 110 is not limited to a disk shape, and has any shape such as a polygon, an ellipse, or the like as long as it can be transported by the transport devices TU1 and TU2 that transport the workpiece W. A notch 110N is formed on an edge of the base substrate 110. Therefore, a rotation position of the monitoring device 100 when it is transported on the stage ST can be controlled constantly. As a material of the base substrate 110, for example, silicon, carbon fiber, quartz glass, silicon carbide, silicon nitride, alumina, and the like are used.

The control substrate 120 is a circuit substrate provided on an upper surface of the plate-shaped base substrate 110. The control substrate 120 includes a plurality of imaging devices 130, a connector pad 160, and a control circuit 170.

The imaging device 130 is a device for detecting scattered light emitted from particles by irradiation with the laser light 70L. The imaging device 130 may be, for example, an image sensor such as a charge coupled device (CCD). The imaging device 130 can acquire an image in a predetermined imaging range in a direction of an optical axis of the imaging device 130. The plurality of imaging devices 130 have an optical axis facing upward on the base substrate 110 to capture an image above the base substrate 110. The optical axis can be defined as an optical central axis of the imaging device 130. The respective imaging devices 130 are disposed apart from each other on the base substrate 110. The imaging device 130 can monitor the scattered light from the particles irradiated with the laser light 70L in a state of being placed on the stage ST. In one example, the plurality of imaging devices 130 may be disposed to be point-symmetrical on the base substrate 110 in a plan view. In addition, the plurality of imaging devices 130 may be disposed to be line-symmetrical on the base substrate 110 in the plan view.

In one example, one of the imaging devices 130 is disposed at a center of the base substrate 110, as illustrated in FIG. 4. In addition, the imaging devices 130 are disposed at a plurality of positions in a radial direction of the base substrate 110. In addition, the imaging devices 130 are disposed at equal intervals in a circumferential direction of the base substrate 110. In one example, on a peripheral edge side of the base substrate 110, the imaging device 130 may be disposed to be denser in the radial direction than a center side. In the illustrated example, in the disk-shaped base substrate 110, the imaging devices 130 are disposed at eight locations including the center along the radial direction. In addition, the imaging devices 130 are disposed at four locations at 90° intervals in the circumferential direction at positions other than the center, respectively. That is, in the illustrated example, the twenty nine imaging devices 130 are disposed on the base substrate 110. In a case where a diameter of the base substrate 110 is 300 mm, as an example, the imaging devices 130 may be disposed at positions of 3 mm, 5 mm, 10 mm, 15 mm, 20 mm, 50 mm, 100 mm, and 150 mm (center) from the peripheral edge of the base substrate 110.

For example, the optical axis of each of the imaging devices 130 is substantially orthogonal to the upper surface of the planar base substrate 110. The optical axis may intersect a plane of the base substrate 110 obliquely. In addition, the imaging device 130 has a translucent cover 131 for protecting the inside from the plasma generated inside the plasma processing apparatus 10. The cover 131 may be formed of, for example, a material such as sapphire.

Figure 6:
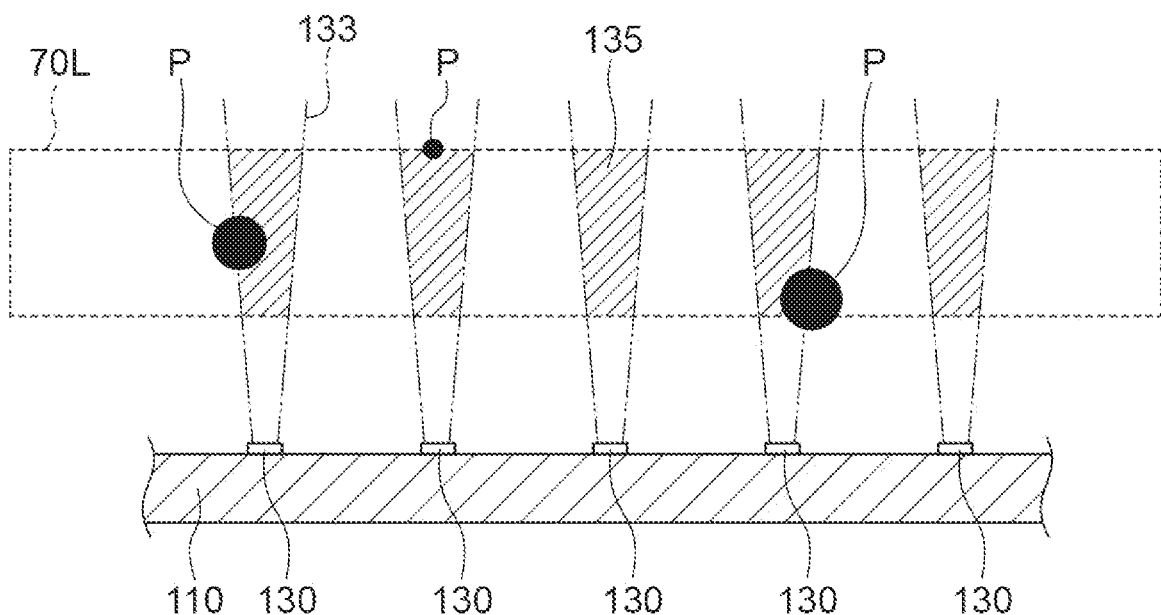
FIG. 6 is a schematic diagram for explaining an imaging range of an imaging device in the monitoring device of the example.

FIG. 6 is a diagram for explaining an imaging range 135 of the imaging device 130 in the monitoring device 100 of an example, and illustrates the imaging ranges 135 of the plurality of imaging devices 130 when viewed from a side. In FIG. 6, the imaging ranges 135 of five imaging devices are schematically illustrated for easy understanding. The imaging range 135 in the example may be a range in which an irradiation surface of the laser light 70L intersects a region 133 along an image angle of the imaging device 130. The imaging device 130 can image scattered light from particles P existing within the imaging range 135. In a state in which the monitoring device 100 is placed on the stage ST in the chamber body 12, the imaging range 135 of each of the plurality of imaging devices 130 may be a region including a region immediately above each of the imaging devices 130. In one example, the imaging range 135 of each of the plurality of imaging devices 130 does not include regions that overlap with each other. That is, the respective imaging ranges 135 of the plurality of imaging devices 130 may be independent regions separated (apart) from each other.

The connector pad 160 is a connection portion for charging the battery 140, and can be connected to an external power supply. The connector pad 160 is connected to the external power supply via the connector 4FC provided in the dedicated FOUP 4F, in a state in which the monitoring device 100 is placed in the dedicated FOUP 4F. A plurality of batteries 140 (four in the illustrated example) are arranged on the base substrate 110. The battery 140 supplies power to the imaging device 130 and the control circuit 170. As illustrated in FIG. 5, a charging circuit 177 is connected between the connector pad 160 and the battery 140, and charging of the battery 140 is controlled by the charging circuit 177. In addition, a power supply circuit 178 is connected to the battery 140, and the power from the battery 140 is supplied to each device via the power supply circuit 178.

The control circuit 170 is disposed at the control substrate 120. The control circuit 170 includes an arithmetic unit 171 including a processor, a memory 172, a controller 173, and the like, and comprehensively controls the operation of the monitoring device 100 based on a program stored in the memory 172. The control circuit 170 functions as a controller that controls each portion of the monitoring device 100. For example, imaging by the imaging device 130 is controlled by the controller 173. In addition, a communication device 175 is connected to the control circuit 170 to control the communication with other external devices. In one example, the communication device 175 is used to connect to the external computer 88. Any of a wired or wireless method may be used as a method of connection between the communication device 175 and the computer 88. In addition, in one example, the monitoring device 100 includes a connector pad 176 connected to the control circuit 170. The connector pad 176 is connected to a switch SW provided on the dedicated FOUP 4F. The control circuit 170 can start controlling the monitoring device 100 based on a signal input from the switch SW. In one example, the switch SW and the controller MC may be communicably connected, and the controller MC may start the control on the processing system 1 based on the signal input from the switch SW.

In one example, the controller 173 causes the imaging device 130 to execute imaging when the laser light 70L is emitted into the chamber body 12 by the laser oscillator 70 in a state in which the monitoring device 100 is placed on the stage ST. The imaging by the imaging device 130 may be executed in synchronization with irradiation of the laser light 70L by the laser oscillator 70. In one example, imaging by the imaging device 130 is executed in synchronization with irradiation of the pulsed laser light 70L scanning inside a horizontal plane. The number of times of imaging at the same laser irradiation position may be once or may be a plurality of times.

Image data imaged by the imaging device 130 can be stored in the memory 172, for example. After the imaging is ended, the image data stored in the memory 172 is transmitted to the computer 88 connected to the communication device 175. The computer 88 (control device) discriminates the particles P in an image of the scattered light imaged by the plurality of imaging devices 130. For example, the computer 88 discriminates the particles P in the image, and counts the particles P in the image by using an image processing technique.

The computer 88 of an example acquires a background image captured by the monitoring device 100 in advance. The background image may be an image captured by the imaging device 130 in a state in which the laser light 70L is emitted into the chamber body 12 in which the particles P do not exist. For example, the computer 88 acquires a plurality of types of background images according to imaging conditions of the particles P. The imaging condition may include, for example, a state in which a gas is supplied into the chamber S and a radio frequency is applied to the upper electrode 30 and the lower electrode LE. Further, the imaging condition may include, for example, a state in which the gas is supplied into the chamber S and the radio frequency is applied only to the upper electrode 30. Further, the imaging condition may include, for example, a state in which the gas is supplied into the chamber S and the radio frequency is not applied to the upper electrode 30 and the lower electrode LE. In this manner, the background image may correspond to a plurality of imaging conditions such as a state in which plasma light emission exists and a state in which plasma light emission does not exist. The plurality of background images in the state in which plasma light emission exists may be acquired according to a value of a radio frequency voltage.

The computer 88 compares the image including the scattered light captured by the imaging device 130 with the background image, and in a case where a difference in brightness value between corresponding pixels exceeds a predetermined threshold value, the computer 88 counts a region including the pixels as the particles P. In addition, the computer 88 may estimate a size of the particles P based on the brightness value (that is, scattered light intensity) of the particles P in the image. For example, the computer 88 may store data indicating a relationship between the scattered light intensity of the particles P and the size (for example, a diameter) of the particles P, which are created by prior measurement or the like.

In addition, the computer 88 specifies a position of the particles P in the image. That is, the computer 88 acquires a position of the pixel counted as the particles P, as the position of the particles P. In a case where a pixel group including a plurality of pixels is discriminated as one particle P, a center of the pixel group may be specified as the position of the particles P.

Figure 7:
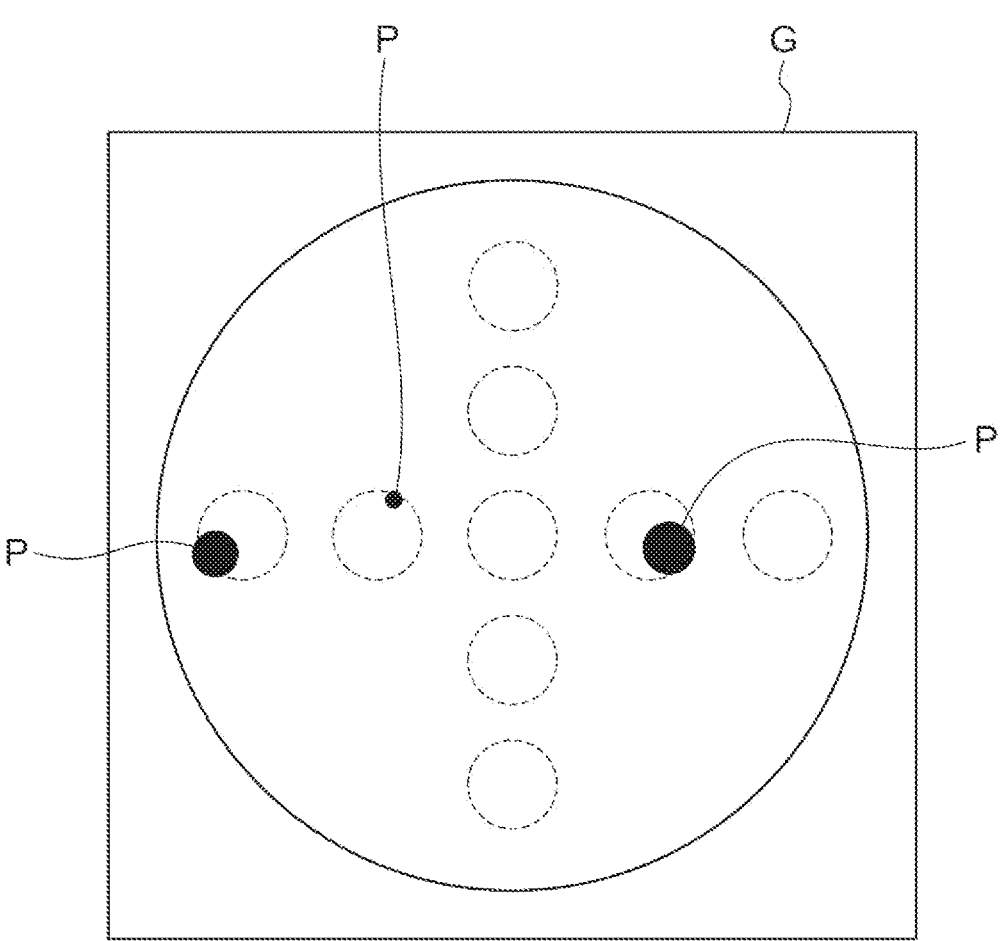
FIG. 7 is a diagram schematically illustrating an example of a composite image based on an image captured by the imaging device.

For example, the computer 88 may combine a plurality of images captured by the plurality of imaging devices 130 as one image to form a plane facing the stage ST. FIG. 7 is a diagram schematically illustrating an example of a composite image. In FIG. 7, a composite image G based on the nine imaging devices is schematically illustrated for easy understanding. In the composite image G in FIG. 7, a region facing the monitoring device 100 on the stage ST is illustrated by a solid line, and an imaging range by each of the imaging devices 130 is illustrated by a broken line. As described above, the respective imaging ranges of the plurality of imaging devices 130 do not overlap with each other. Therefore, the composite image may be an image in which a plurality of imaging ranges are separated from each other. The computer 88 may specify a position of the particles P in the composite image, and display a size or the like at the position of the particles P.

Figure 8:
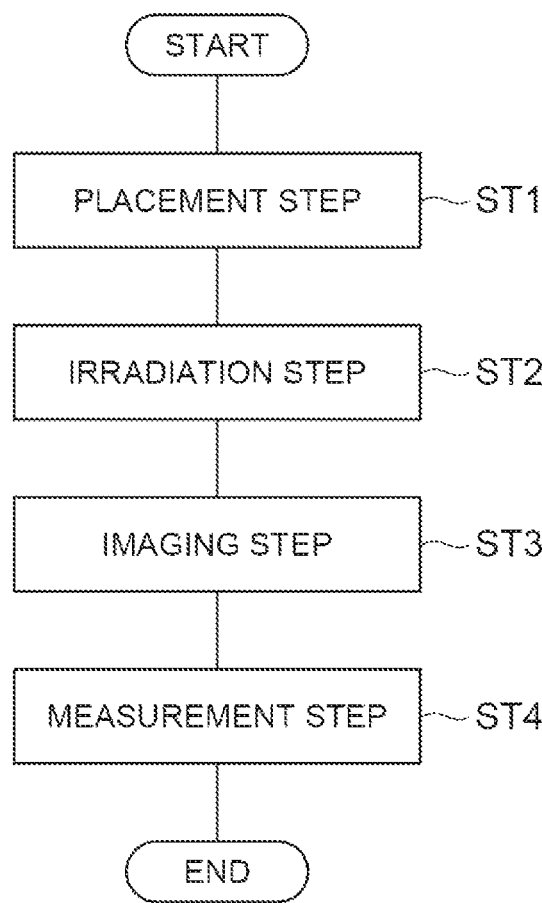
FIG. 8 is a flowchart illustrating an example of an operation method of the monitoring device.

Subsequently, a monitoring method for measuring particles using the monitoring device 100 will be described. FIG. 8 is a flowchart illustrating an example of the monitoring method. As illustrated in FIG. 8, in the example of the monitoring method, the monitoring device 100 is transported into the plasma processing apparatus 10 (process module PM) as a monitoring target by the transport devices TU1 and TU2 (placement step: step ST1). The laser oscillator 70 may be attached to the plasma processing apparatus 10 in advance. In a case of operating the monitoring device 100, first, the monitoring device 100 placed inside the dedicated FOUP 4F is activated. As described above, since the dedicated FOUP 4F is provided with the switch SW for activating the monitoring device 100, the switch SW enables the monitoring device 100 to be activated. In a case of monitoring the particles P in the chamber body 12 by using the monitoring device 100, first, the monitoring device 100 is activated by the switch SW. The monitoring device 100 may be stored in a stocker 3 capable of depressurizing, which is connected to the transport device TU2 in a depressurized environment, and may be transported from the stocker 3 to the plasma processing apparatus 10. In the example illustrated in FIG. 1, for example, the stocker 3 is disposed with the process modules PM1 to PM5. The monitoring device 100 may be transported from the stocker 3 to the plasma processing apparatus 10 by the transport device TU2. The stocker 3 may have the switch SW or the like, in the same manner as the FOUP 4F.

In a case where the switch SW is operated, a signal from the switch SW is also output to the controller MC. The controller MC, to which the signal from the switch SW is input, controls the processing system 1 such that the transport devices TU1 and TU2 transport the monitoring device 100 from the FOUP 4F to the stage ST inside the process module PM. In one example, the controller MC may transport the monitoring device 100 onto the electrostatic chuck ESC of the stage ST, and then supply a gas to the chamber S and apply a radio frequency to the upper electrode 30 and the lower electrode LE to generate a plasma.

Subsequently, the inside of the plasma processing apparatus 10 is irradiated with the laser light 70L (irradiation step: step ST2). In one example, in a case where the monitoring device 100 is activated by the switch SW, a signal notifying the activation of the monitoring device 100 is also output to the computer 88. When it is determined that the monitoring device 100 is transported to the process module PM1, the computer 88 controls the laser oscillator 70 such that the irradiation of the laser light 70L by the laser oscillator 70 is started. For example, in a case where a predetermined time (hereinafter, referred to as a first time) elapses since the signal for notifying the activation of the monitoring device 100 is input, the computer 88 may determine that the monitoring device 100 is transported to the process module PM1. The irradiation of the laser light 70L by the laser oscillator 70 may be ended after a lapse of the predetermined time from the start of the irradiation.

Subsequently, the scattered light from the particles P irradiated with the laser light 70L is imaged by the imaging device 130 (imaging step: step ST3). When it is determined that the monitoring device 100 is transported onto the electrostatic chuck ESC, the controller 173 controls the imaging device 130 such that the imaging operation on the particles P by the imaging device 130 is started. For example, when a predetermined time (hereinafter, referred to as a second time) elapses since the signal of the switch SW is input, the controller 173 may determine that the monitoring device 100 is placed on the electrostatic chuck ESC. In one example, the first time and the second time may have the same length. That is, the imaging device 130 may start imaging at a start of the irradiation of the laser light 70L by the laser oscillator 70.

As an example, the controller 173 controls the imaging device 130 such that a timing of imaging is synchronized with an irradiation timing of the pulsed laser light 70L scanning in a horizontal plane. The imaging operation by the imaging device 130 is ended after a lapse of a predetermined time from the start of the imaging. An imaging time by the imaging device 130 may coincide with an irradiation time of the laser light 70L by the laser oscillator 70. The imaging operation is continued until scanning in the horizontal plane with the laser light 70L is ended.

The controller MC controls the processing system 1 such that the transport devices TU1 and TU2 transport the monitoring device 100 from the stage ST to the FOUP 4F after the imaging by the monitoring device 100 is ended. That is, the transport device TU2 takes out the monitoring device 100 from the process module, and transports the monitoring device 100 to one of the load lock module LL1 and the load lock module LL2. Next, the transport device TU1 takes out the monitoring device 100 from one of the load lock modules, and transports the monitoring device 100 to the FOUP 4F. For example, in a case where a predetermined time elapses after the monitoring device 100 is transported onto the stage ST, the controller MC may determine that the imaging by the monitoring device 100 is ended.

Subsequently, the particles P in the image are discriminated (measurement step: step ST4). In one example, when the monitoring device 100 returns to the FOUP 4F, image data stored in the memory 172 of the monitoring device 100 is transmitted to the computer 88. The computer 88 measures the particles P based on the acquired image data. In one example, the computer 88 combines a plurality of images captured by the plurality of imaging devices 130. Then, the computer 88 specifies positions of the particles P in the composite image, and executes counting of the particles P. In addition, the computer 88 estimates a size of each of the discriminated particles P. The computer 88 may superimpose the discriminated positions of the particles P on the composite image, and display the particles P. In addition, the computer 88 may output the number of particles P and the size of each particle P together with the composite image.

As described above, in one exemplary embodiment, a particle monitoring system that measures the particles P in the plasma processing apparatus 10 is provided. The system includes the laser oscillator 70 that irradiates the inside of the plasma processing apparatus 10 with the laser light 70L, and the monitoring device 100 placed on the stage ST in the plasma processing apparatus 10. The monitoring device 100 includes the base substrate 110, the plurality of imaging devices 130, and the computer 88. The plurality of imaging devices 130 are disposed apart from each other on the base substrate 110 to image the upper side, and capture an image including scattered light from the particles P irradiated with the laser light 70L. The computer 88 discriminates the particles P in the image captured by the plurality of imaging devices 130.

In the particle monitoring system described above, the particles P in the plasma processing apparatus 10 are imaged by the plurality of imaging devices 130 of the monitoring device 100 placed on the stage ST. The plurality of imaging devices 130 are disposed apart from each other on the base substrate 110. Therefore, the imaging ranges 135 that are imaged by the respective imaging devices 130 are different from each other. That is, each of the imaging devices 130 can image the particles P in different regions in the plasma processing apparatus 10. Therefore, in the particle monitoring system, a distribution of the particles P in the plasma processing apparatus 10 can be acquired by discriminating the particles P in the image captured by the plurality of imaging devices 130.

In one exemplary embodiment, the computer 88 may count the particles P in the image captured by the plurality of imaging devices 130. With this configuration, a distribution pattern of the particles P can be acquired quantitatively.

In one exemplary embodiment, the computer 88 may acquire the positions of the particles P in the image captured by the plurality of imaging devices 130. With this configuration, a more detailed distribution pattern of the particles P can be acquired.

In one exemplary embodiment, the computer 88 may acquire the size of the particles P in the image captured by the plurality of imaging devices 130. With this configuration, it is possible to acquire a distribution of the sizes of the particles P.

In one exemplary embodiment, the imaging range 135 of each of the plurality of imaging devices 130 in the plasma processing apparatus 10 does not include an overlapping region. In this configuration, the particles P are prevented from being counted in an overlapping manner.

In one exemplary embodiment, the imaging device 130 may be disposed on the peripheral edge side of the base substrate 110 such that the imaging device 130 is denser in the radial direction than the center side. In this configuration, the particles above the peripheral edge of the base substrate 110 are easily observed.

In one exemplary embodiment, the imaging step (step ST3) may be executed in a state in which a gas is supplied into the chamber S. With this configuration, the particle under an environment where the gas is supplied into the chamber S can be counted.

In one exemplary embodiment, the imaging step (step ST3) may be executed in a state in which a plasma is generated in the chamber S. With this configuration, the particle under an environment where the plasma is generated can be counted.

Although various exemplary embodiments are described above, without being limited to the exemplary embodiments described above, various omissions, substitutions, and changes may be made.

A capacitively-coupled plasma processing apparatus is described as the plasma processing apparatus, and a form of the plasma processing apparatus is not limited to this example. For example, the plasma processing apparatus may be an inductively-coupled plasma processing apparatus. Further, the plasma processing apparatus may be a plasma processing apparatus that generates a plasma by using surface waves such as microwaves.

The example in which the imaging devices are evenly disposed in the circumferential direction at the predetermined positions in the radial direction on the base substrate is described, and the arrangement mode of the imaging devices is not limited to this example. For example, the number of imaging devices to be disposed in the circumferential direction may be increased as a distance from the center is increased in the radial direction. In addition, the imaging devices may be evenly disposed in the X-direction and the Y-direction with the base substrate as the XY plane such that the imaging devices are disposed in a lattice pattern.

The example in which the captured image data is transmitted to the computer 88 after the end of all the imaging is described. Meanwhile, the captured image data may be transmitted to the computer 88 in real time by wireless communication when the imaging is executed by the imaging device 130, for example. In this case, the computer 88 may count the particles in real time. In addition, the captured image data may be transmitted to the computer 88 by wireless communication or the like when the transport devices TU1 and TU2 transport the monitoring device 100 from the stage ST to the FOUP 4F after the imaging by the monitoring device 100 is ended. In addition, for example, a transmission unit may be provided in the monitoring device 100, a reception unit may be provided in the stage ST, and the image data stored in the memory 172 of the monitoring device 100 may be transported from the transmission unit of the monitoring device 100 to the reception unit of the stage ST by a wired or wireless manner. In this case, the reception unit of the stage ST may be connected to an external computer.

The example of discriminating the scattered light from the particles P by comparison with the background image acquired in advance is described. Meanwhile, the imaging may be executed by an imaging device including, for example, a wavelength filter that passes light of a wavelength of the laser light and does not pass light of a wavelength of plasma light emission.

For example, the imaging device 130 may be an image sensor such as a CCD built into the control substrate 120. That is, the imaging device 130 may be incorporated into the control substrate 120 by a semiconductor manufacturing process including a lithography process.

Although the example in which the computer 88 counts the particles of the image captured by the imaging device 130 is described, for example, the particles of the image may be counted by the arithmetic unit 171 of the monitoring device 100.

Although the laser oscillator 70 is described as a light emitting device that emits light, for example, the light emitting device may be a light-emitting diode (LED) light source or the like. In this case, the LED light source may be provided on the upper surface of the monitoring device 100, and configured to be capable of irradiating the inside of the chamber S.

The various exemplary embodiments included in this disclosure are described in the following [E1] to [E11].

[1] A particle monitoring system for measuring a particle in a plasma processing apparatus, the system comprising:

a light emitting device for irradiating an inside of the plasma processing apparatus with light;

a monitoring device to be placed on a stage in the plasma processing apparatus, the monitoring device including a plate-shaped base substrate, and a plurality of imaging devices having optical axes facing upward on the base substrate, and being disposed apart from each other to capture images including scattered light from the particle irradiated with the light; and a control device for discriminating the particle in the images captured by the plurality of imaging devices.

[2] The particle monitoring system according to Embodiment E1, wherein the light emitting device is a laser oscillator for emitting laser light as the light.

[3] The particle monitoring system according to Embodiment E1 or E2, wherein the control device counts the particle in the images captured by the plurality of imaging devices.

[4] The particle monitoring system according to any one of Embodiments E1 to E3, wherein the control device acquires a position of the particle in the images captured by the plurality of imaging devices.

[5] The particle monitoring system according to any one of Embodiments E1 to E4, wherein the control device acquires a size of the particle in the images captured by the plurality of imaging devices.

[6] The particle monitoring system according to any one of Embodiments E1 to E5, wherein an imaging range of each of the plurality of imaging devices in the plasma processing apparatus does not include an overlapping region.

[7] A particle monitoring method of measuring a particle in a plasma processing apparatus by using a monitoring device, in which the monitoring device includes a plate-shaped base substrate, and a plurality of imaging devices having optical axes facing upward on the base substrate, and being disposed apart from each other, and the method comprising:

placing the monitoring device on a stage in a chamber of the plasma processing apparatus;

irradiating an inside of the chamber of the plasma processing apparatus with light;

imaging scattered light from the particle irradiated with the light by the plurality of imaging devices; and discriminating the particle in an image captured by the plurality of imaging devices.

[8] The particle monitoring method according to Embodiment E7, wherein the irradiating with the light, laser light is emitted as the light.

[9] The particle monitoring method according to Embodiment E7 or E8, wherein the imaging by the plurality of imaging devices is executed in a state where a gas is supplied into the chamber.

[10] The particle monitoring method according to Embodiment E7 or E8, wherein the imaging by the plurality of imaging devices is executed in a state where a plasma is generated in the chamber.

[11] A monitoring device for measuring a particle in a plasma processing apparatus, the device comprising:

a light emitting device for irradiating an inside of the plasma processing apparatus with light;

a plate-shaped base substrate placed on a stage in the plasma processing apparatus;

a plurality of imaging devices having optical axes facing upward on the base substrate, and being disposed apart from each other to capture images including scattered light from the particle irradiated with the light incident into the plasma processing apparatus; and a control device for discriminating the particle in the images captured by the plurality of imaging devices.

From the above description, it will be understood that various embodiments of the present disclosure have been described herein for purposes of description, and that various modifications may be made without departing from the scope and spirit of the present disclosure. Accordingly, the various embodiments disclosed herein are not intended to be limiting, with the true scope and spirit being indicated by the aspects following claims.

What is claimed is:

1. A particle monitoring system comprising:

a plasma processing apparatus including a chamber and a stage disposed in the chamber;

a monitoring device including a plate-shaped base substrate, and a plurality of imaging devices having optical axes facing upward on the base substrate, and being disposed apart from each other;

a transport device configured to transport the monitoring device onto the stage;

a light emitting device for irradiating light from a side surface of the chamber to irradiate an inside of the chamber with light; and a control device for discriminating the particle in the images captured by the plurality of imaging devices of the monitoring device when placed on the stage.

2. The particle monitoring system according to claim 1, wherein the light emitting device is a laser oscillator for emitting laser light as the light.

3. The particle monitoring system according to claim 1, wherein the control device counts the particle in the images captured by the plurality of imaging devices.

4. The particle monitoring system according to claim 1, wherein the control device acquires a position of the particle in the images captured by the plurality of imaging devices.

5. The particle monitoring system according to claim 1, wherein the control device acquires a size of the particle in the images captured by the plurality of imaging devices.

6. The particle monitoring system according to claim 1, wherein an imaging range of each of the plurality of imaging devices in the plasma processing apparatus does not include an overlapping region.

7. A particle monitoring method of measuring a particle in a plasma processing apparatus by using a monitoring device, in which the monitoring device includes a plate-shaped base substrate, and a plurality of imaging devices having optical axes facing upward on the base substrate, and being disposed apart from each other, and the method comprising:

placing the monitoring device on a stage in a chamber of the plasma processing apparatus;

irradiating an inside of the chamber of the plasma processing apparatus with light;

imaging scattered light from the particle irradiated with the light by the plurality of imaging devices; and discriminating the particle in an image captured by the plurality of imaging devices.

8. The particle monitoring method according to claim 7, wherein the irradiating with the light, laser light is emitted as the light.

9. The particle monitoring method according to claim 7, wherein the imaging by the plurality of imaging devices is executed in a state where a gas is supplied into the chamber.

10. The particle monitoring method according to claim 7, wherein the imaging by the plurality of imaging devices is executed in a state where a plasma is generated in the chamber.

11. A particle monitoring system comprising:

a plasma processing apparatus including a chamber and a stage disposed in the chamber; and a monitoring device for measuring a particle in a plasma processing apparatus, the monitoring device being in the chamber and comprising:

a plate-shaped base substrate having a shape of a wafer and including a notch on an edge thereof for rotational alignment;

a plurality of imaging devices having optical axes facing upward on the base substrate, and being disposed apart from each other to capture images including scattered light from the particle irradiated with light incident from a side surface of a chamber of the plasma processing apparatus; and a control device for discriminating the particle in the images captured by the plurality of imaging devices.

12. The particle monitoring method according to claim 7, wherein the irradiating includes irradiating light from a side surface of the chamber to irradiate an inside of the chamber with light.

* * * * *